United States Patent [19]
Heiligman

[11] Patent Number: 5,840,348
[45] Date of Patent: Nov. 24, 1998

[54] AUTOMATED CARBON BLOCK MOLDING MACHINE AND METHOD

[75] Inventor: Randy B. Heiligman, Minnetonka, Minn.

[73] Assignee: Ultrapure Systems, Inc., Minneapolis, Minn.

[21] Appl. No.: 529,290

[22] Filed: Sep. 15, 1995

[51] Int. Cl.⁶ ........................................................ B28B 7/42
[52] U.S. Cl. ........................ 425/407; 425/412; 425/414; 425/416
[58] Field of Search ................................ 425/407, 412, 425/414, 416

[56] References Cited

U.S. PATENT DOCUMENTS

| | | | |
|---|---|---|---|
| 1,371,671 | 3/1921 | Duryea et al. | 264/84 |
| 1,374,493 | 4/1921 | Dimitri et al. | 501/94 |
| 1,822,939 | 9/1931 | Stout | 425/416 |
| 1,918,064 | 7/1933 | Taylor | 425/352 |
| 2,195,297 | 3/1940 | Engle | 425/78 |
| 2,327,241 | 8/1943 | Berger | 425/412 |
| 2,393,130 | 1/1946 | Toulmin, Jr. | 219/149 |
| 2,437,127 | 3/1948 | Richardson | 264/486 |
| 2,439,424 | 1/1948 | Goodloe et al. | 264/324 |
| 2,632,207 | 3/1953 | Mahla | 18/17 |
| 2,746,608 | 5/1956 | Briggs | 210/504 |
| 2,762,078 | 6/1956 | Haller | 425/78 |
| 3,107,141 | 10/1963 | Crafton | 264/109 |
| 3,249,964 | 5/1966 | Shaler | 425/78 |
| 3,342,917 | 9/1967 | Laskiewicz | 425/444 |
| 3,346,678 | 10/1967 | Ohlgren | 264/29.7 |
| 3,347,967 | 10/1967 | Hopkins et al. | 264/115 |
| 3,383,737 | 5/1968 | Greger | 425/406 |
| 3,384,922 | 5/1968 | Winsnes | 425/408 |
| 3,413,694 | 12/1968 | Thomas, Sr. | 425/167 |
| 3,474,600 | 10/1969 | Tobias | 55/524 |
| 3,521,326 | 7/1970 | Rice et al. | 425/352 |
| 3,538,020 | 11/1970 | Heskett et al. | 210/496 |
| 3,555,597 | 1/1971 | Meadows | 425/78 |
| 3,566,439 | 3/1971 | Mouly et al. | 425/144 |
| 3,645,072 | 2/1972 | Clapham | 55/387 |
| 3,775,036 | 11/1973 | Winning | 425/430 |
| 3,797,986 | 3/1974 | Onder | 425/352 |
| 3,832,107 | 8/1974 | Cox et al. | 425/78 |
| 3,836,311 | 9/1974 | Hackstein et al. | 425/406 |
| 3,988,088 | 10/1976 | King et al. | 425/78 |
| 4,000,236 | 12/1976 | Redfarn et al. | 264/112 |
| 4,009,234 | 2/1977 | Erlandson et al. | 264/439 |
| 4,032,457 | 6/1977 | Matchett | 210/489 |
| 4,041,123 | 8/1977 | Lange et al. | 264/332 |
| 4,061,807 | 12/1977 | Shaler et al. | 428/36 |
| 4,094,897 | 6/1978 | Nagasawa et al. | 264/105 |
| 4,157,317 | 6/1979 | Nagasawa et al. | 252/511 |
| 4,229,398 | 10/1980 | Harvey | 264/113 |
| 4,240,780 | 12/1980 | Carcey | 425/407 |
| 4,350,672 | 9/1982 | Layden, Jr. et al. | 423/445 |
| 4,431,503 | 2/1984 | Withers et al. | 204/294 |
| 4,490,321 | 12/1984 | Klinkaii | 264/109 |
| 4,518,411 | 5/1985 | Hailey | 419/48 |

(List continued on next page.)

FOREIGN PATENT DOCUMENTS

243628  2/1963  Australia .

*Primary Examiner*—David W. Wu
*Attorney, Agent, or Firm*—Kinney & Lange, P.A.

[57] ABSTRACT

A carbon block molding machine which automates the heating, compressing and cooling steps which previously were done by hand. A mold unit has an inner sleeve for receiving the mixture of granular carbon particles and the hinder. A pressure unit compresses the granular carbon particles and binder in the sleeve. A heating unit integrally heats the sleeve to melt the hinder to bond the compressed carbon particles to form the carbon block within the sleeve. Preferably, a cooling unit cools the sleeve for removal of the finished carbon block. A programmed control unit selectively controls operation of the pressure unit, the heating unit and the cooling unit so that the heating unit is activated while the pressure unit compresses the granular carbon particles and the hinder. The heating unit is preferably a two-piece heater that is maintained at an elevated temperature and selectively moved into contact with the sleeve to heat the sleeve.

30 Claims, 8 Drawing Sheets

U.S. PATENT DOCUMENTS

| | | | |
|---|---|---|---|
| 4,526,526 | 7/1985 | Krogh | 425/71 |
| 4,532,091 | 7/1985 | Dias et al. | 264/29.5 |
| 4,556,484 | 12/1985 | Hunter et al. | 210/90 |
| 4,609,527 | 9/1986 | Rinderle et al. | 419/32 |
| 4,619,805 | 10/1986 | Dias et al. | 264/29.5 |
| 4,619,948 | 10/1986 | Kennedy et al. | 521/52 |
| 4,620,839 | 11/1986 | Moritoki et al. | 425/407 |
| 4,647,426 | 3/1987 | Fiorentino | 419/31 |
| 4,664,683 | 5/1987 | Degen et al. | 55/387 |
| 4,686,037 | 8/1987 | Lang | 210/221.2 |
| 4,693,823 | 9/1987 | Matchett | 210/266 |
| 4,753,728 | 6/1988 | VanderBilt et al. | 210/282 |
| 4,770,768 | 9/1988 | Lang | 210/94 |
| 4,798,524 | 1/1989 | Ramm | 425/77 |
| 4,800,050 | 1/1989 | Hahn et al. | 264/40.6 |
| 4,826,630 | 5/1989 | Radford et al. | 252/478 |
| 4,854,843 | 8/1989 | Takeda et al. | 425/437 |
| 4,859,386 | 8/1989 | VanderBilt et al. | 264/113 |
| 4,874,564 | 10/1989 | Sudani et al. | 264/24.7 |
| 4,882,103 | 11/1989 | Kawakubo et al. | 264/29.5 |
| 4,950,443 | 8/1990 | Kawakubo et al. | 264/29.5 |
| 4,966,538 | 10/1990 | Linke et al. | 425/144 |
| 5,009,823 | 4/1991 | Kromrey | 264/29.7 |
| 5,017,318 | 5/1991 | Vanderbilt et al. | 264/113 |
| 5,024,764 | 6/1991 | Holler | 210/484 |
| 5,043,111 | 8/1991 | Hinzmann et al. | 425/78 |
| 5,080,841 | 1/1992 | Nishio | 264/40.6 |
| 5,147,722 | 9/1992 | Koslow | 428/402 |
| 5,158,132 | 10/1992 | Guillemot | 165/30 |
| 5,167,889 | 12/1992 | Alvarez et al. | 264/120 |
| 5,189,092 | 2/1993 | Koslow | 524/495 |
| 5,249,948 | 10/1993 | Koslow | 425/376.1 |
| 5,256,287 | 10/1993 | Underwood | 210/282 |
| 5,263,841 | 11/1993 | de Soet | 425/384 |
| 5,277,570 | 1/1994 | Siggers | 425/195 |
| 5,288,447 | 2/1994 | Day | 264/112 |
| 5,338,172 | 8/1994 | Williamson et al. | 425/143 |
| 5,348,694 | 9/1994 | Goldberger | 264/27 |
| 5,360,330 | 11/1994 | Jensen et al. | 425/144 |
| 5,399,303 | 3/1995 | Yamaguchi et al. | 264/40.5 |

AUTOMATED CARBON BLOCK MOLDING MACHINE AND METHOD

BACKGROUND OF THE INVENTION

The present invention relates to a machine and a method for making carbon blocks which are used for filtration purposes. More particularly, the present invention relates to a machine and automated method for making such carbon blocks under high pressure and temperature.

Carbon blocks are used for filtration of a variety of substances such as water and fuel vapors. Traditionally, carbon blocks have been manufactured using individual molds which are hand or machine filled with a mixture of granular carbon particles and a plastic binder. The mixture is compressed within the mold and then the molds are transferred to a hatch or conveyor oven to hake for about 20 minutes or until the binder melts to bond the carbon particles together. After baking in the oven for the necessary time period, the operator removes the mold and then puts the mold into a cooling apparatus to quickly lower the temperature of the mold and the carbon block. When the mold is cool, the operator opens the mold and removes the molded carbon block. Each production run requires approximately 40 minutes using this technique and so that approximately 60 blocks can he made per hour with one operator.

Another method of manufacturing carbon blocks involves extrusion. This technique involves using an auger to extrude and compress the granular carbon particles and binder in a long, heated mold unit. The carbon block forms and moves within the mold unit as the new material is extruded into the mold unit. After cooling, the finished carbon blocks are cut to desired length at the end of the extruder. One of the disadvantages of this method is that the carbon blocks are not produced to size, but rather they are cut to size which involves an extra step in the operation.

SUMMARY OF THE INVENTION

The present invention provides a machine and automated method for manufacturing carbon blocks which reduces the time of a production run to approximately 5–6 minutes. A machine according to the present invention can output between 60–90 carbon blocks per hour with one operator.

The present invention automates the heating, compression and cooling steps which previously were done by hand operation. More specifically, the present invention includes a mold unit having a chamber for receiving the granular carbon particles and the binder therein, the chamber being closeable to provide a mold for the carbon block; a pressure unit operable with the mold for compressing the granular carbon particles and the binder in the chamber; a heating unit for heating the mold to melt the binder to bond the compressed carbon particles to each other to form the carbon block; and a programmable control unit for selectively controlling the pressure unit and the heating unit so that the heating unit is activated while the pressure unit compresses the granular carbon particles and the binder.

Preferably, the pressure unit includes a piston operable to compress the mixture in the mold chamber. The pressure unit is further controlled by the control unit to eject the finished carbon blocks from the mold. Also, a cooling unit is preferably provided for cooling the mold and carbon block so that the carbon block can he quickly removed from the mold to speed the production run. The cooling unit is controlled by the programmable control unit.

In one embodiment, the heating unit is a two-part unit which surrounds the mold into which the carbon mixture is dispensed. Each heating part is movable from a first position where the heating part is in contact with the mold to a second position where the heating part is not in contact with the mold. Each heating part has a plurality of heater units therein which are activated while the heating part is in both the first and second positions so that the heating unit is constantly maintained in a heated state for heating the mold and the mixture. The cooling unit sprays a cooling fluid directly on the mold when the heating parts are in the second position to quench the plastic binder material for removal of the finished carbon block from the mold.

The present invention also provides an automated method for making carbon blocks. The steps of the method include dispensing a mixture of carbon powder into a mold while the mold is maintained in a first position; compressing the carbon powder and the binder within the mold while the mold is maintained in the first position; heating the mold using heaters while the mold is maintained in the first position; and removing the carbon block from the mold after it has cooled.

DETAILED DESCRIPTION OF THE PREFERRED EMBODIMENTS

Figure 1:
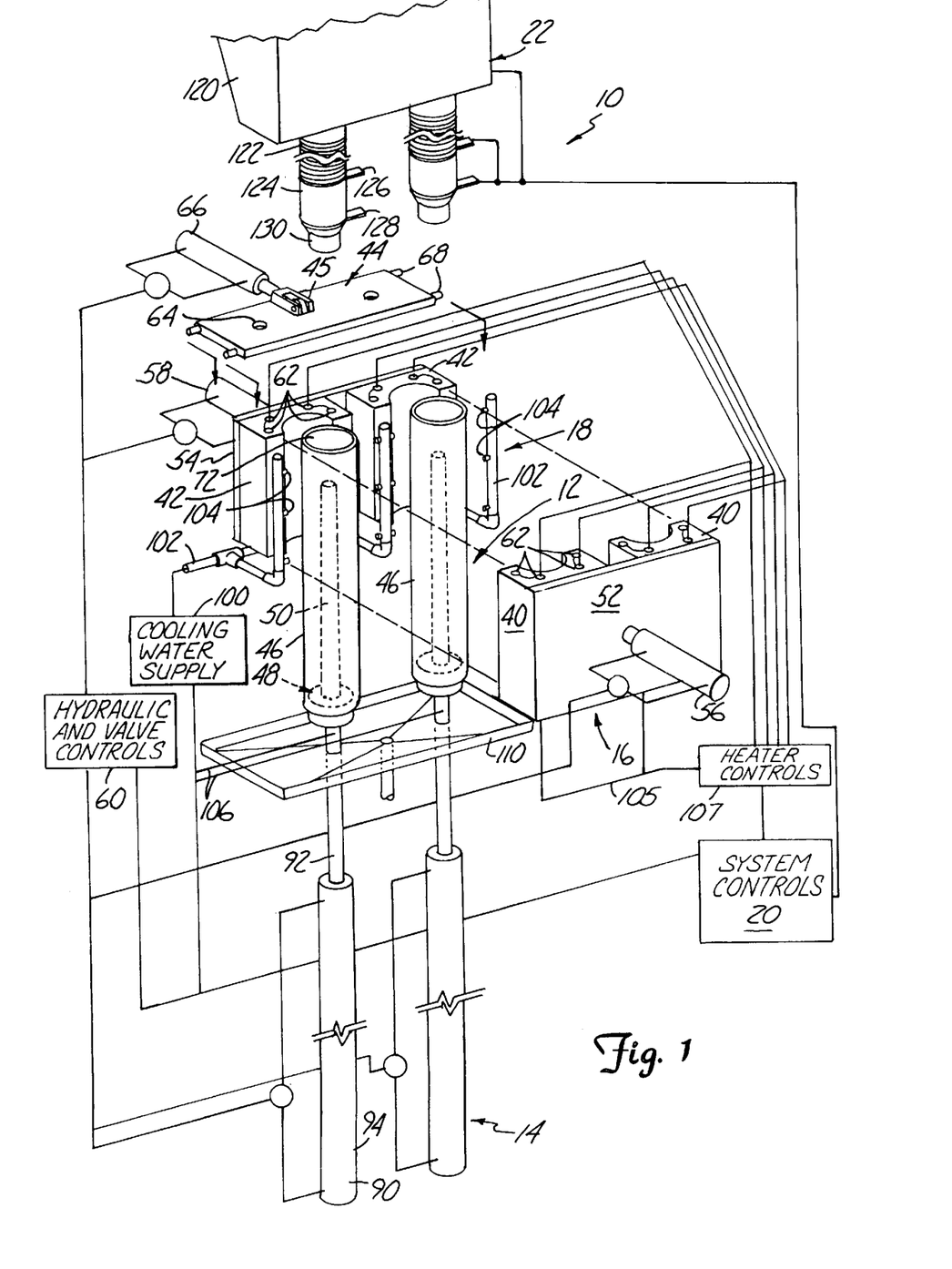
FIG. 1 is a diagrammatic view of an automated carbon block molding machine in accordance with the teachings of the present invention.
Figure 2:
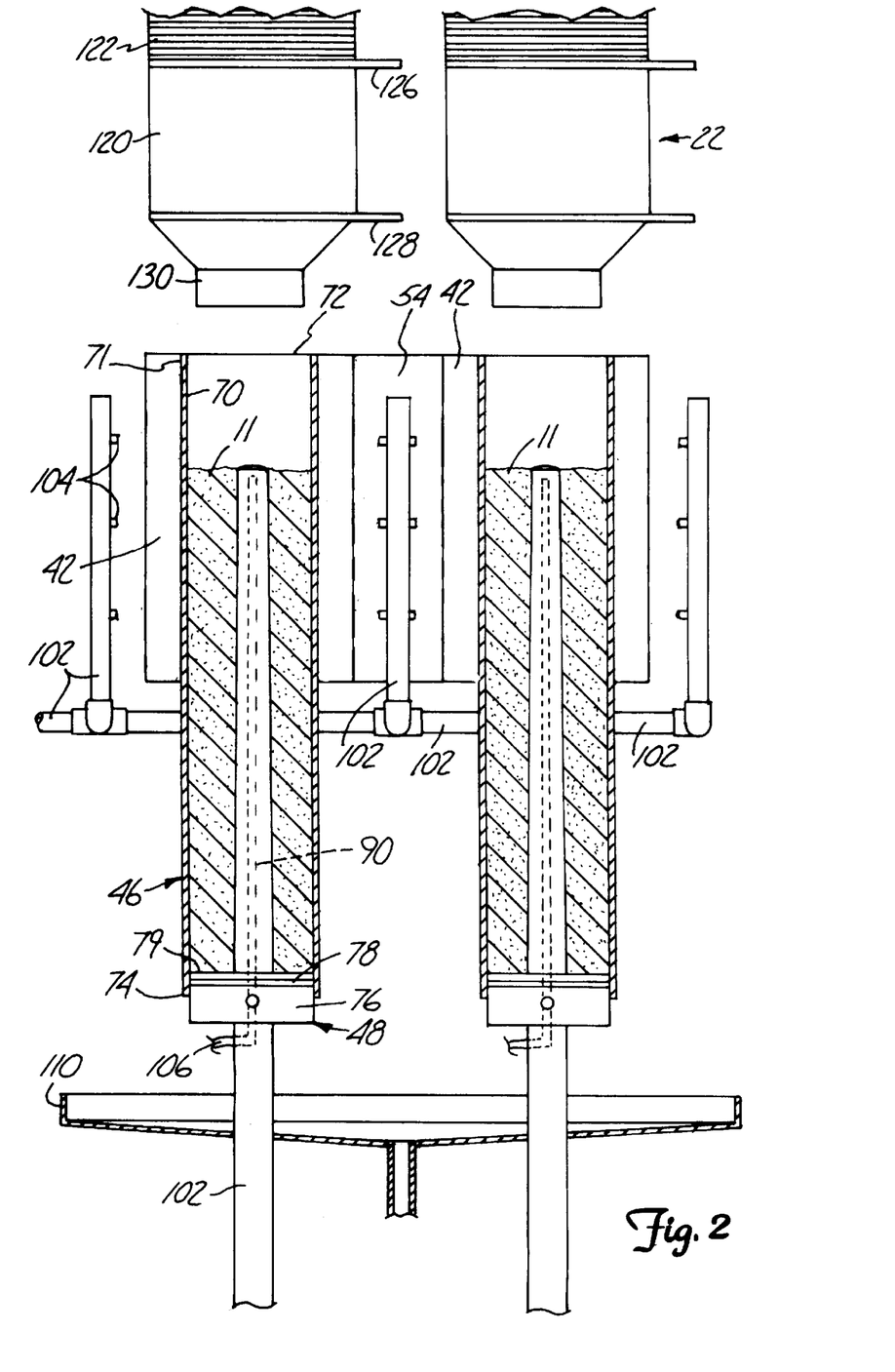
FIG. 2 is a front elevation view, with some parts shown in section, of a portion of the automated carbon block molding machine of FIG. 1 in an initial filling stage of operation.

FIG. 1 shows an carbon block molding system which includes an automated carbon block molding machine 10 for making carbon blocks from a mixture of granular carbon particles and a plastic binder material 11 (see FIG. 2). Mixture 11 is well known in the art and typically includes carbon particles having a grain size between 20×50 mesh and 80×325 mesh together with a plastic binder material. The automated carbon block molding machine 10 performs the steps of a method for making carbon blocks which includes compressing the carbon powder and hinder mixture 11 in a mold, heating the mold to melt the plastic binder to bond the granular carbon particles to form the carbon block, and then cooling the carbon block for removal from the mold.

The automated carbon block molding machine 10 includes at least one mold unit 12, a compression unit 14, a heating unit 16, a cooling unit 18, a control unit 20, and a dispensing unit 22.

Figure 4:
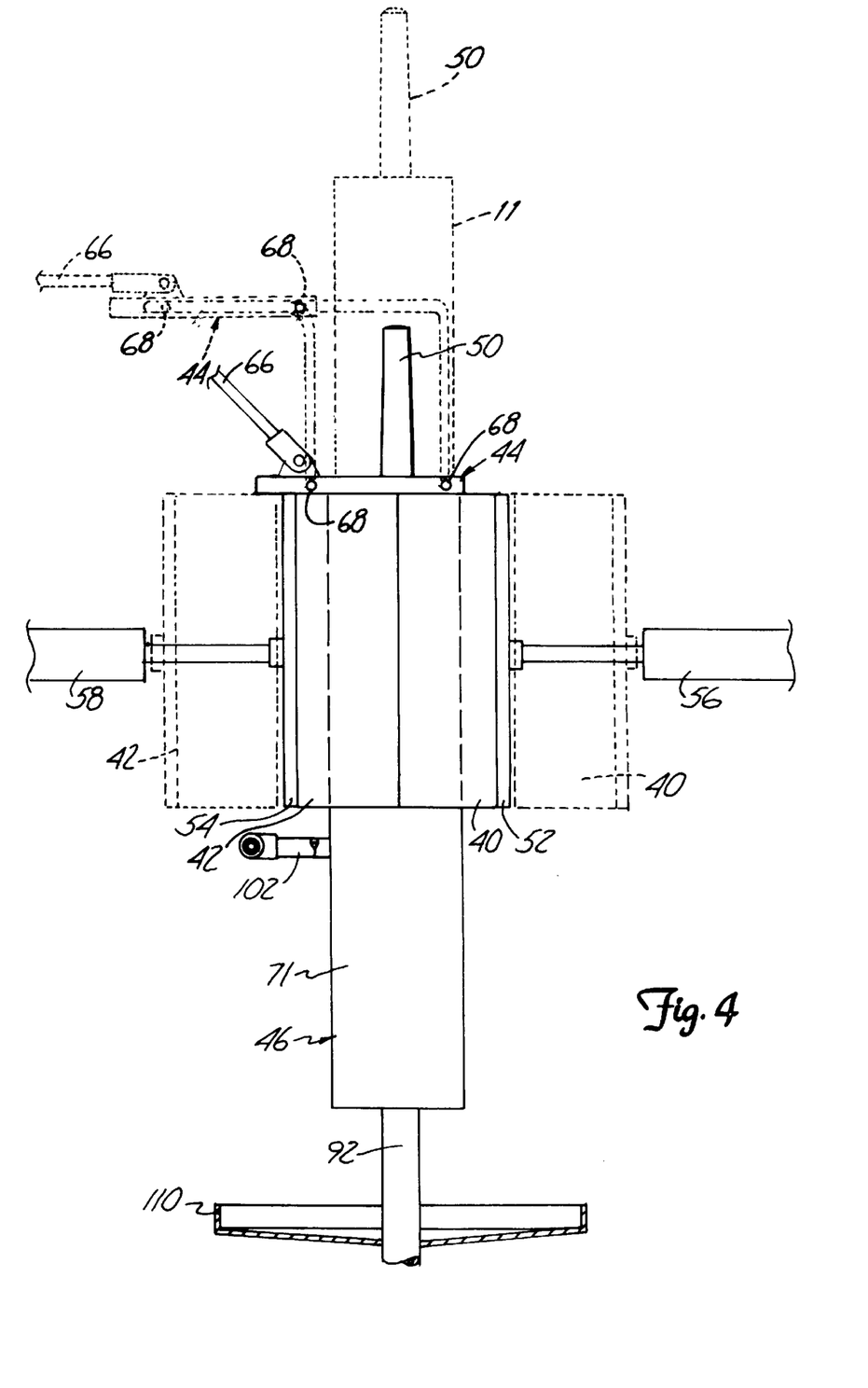
FIG. 4 is a view taken from the left side of FIG. 3 showing the automated carbon block molding machine in the heating stage of operation, a cooling stage of operation shown in phantom and a finished stage of operation also shown in phantom.
Figure 6:
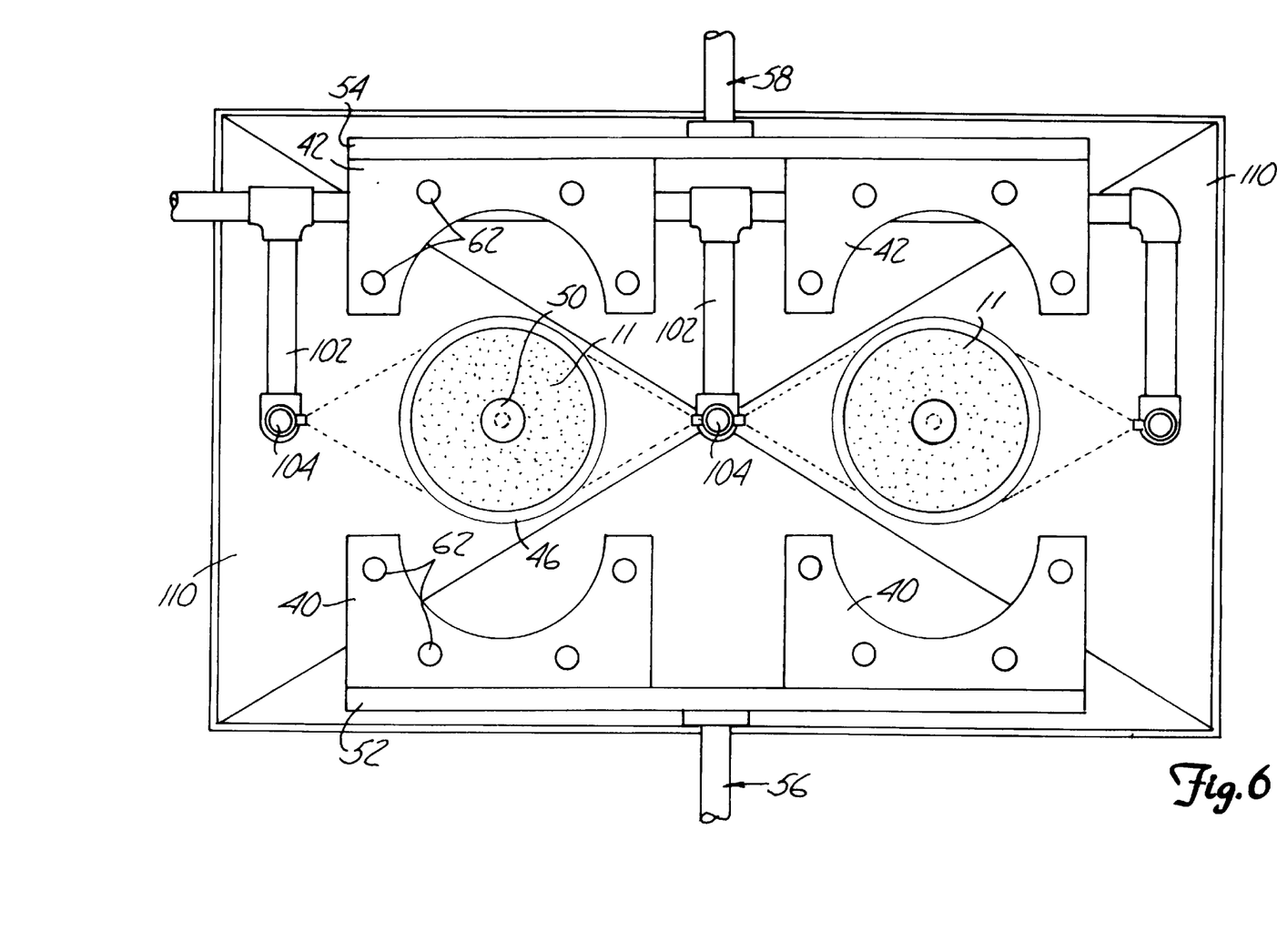
FIG. 6 is a top plan view of the automated carbon block molding machine similar to FIG. 5, in the cooling stage of operation.

Each mold unit 12 includes a mold plate top 44, a sleeve 46, a mold bottom 48, and a mold center tube 50. Heating unit 16 includes first and second heater halves 40 and 42 that are U-shaped metallic housings with an open bottom and an open top. The heater halves 40 and 42 mate with each other to surround sleeve 46 of mold unit 12. As shown in FIGS. 4 and 6, the first and second heater halves 40 and 42 are moveable between a closed position where the heater halves 40 and 42 are mated around sleeve 46 for heating the sleeve and an open position where the heater halves 40 and 42 are separated from sleeve 46 a sufficient distance to allow direct cooling of sleeve 46 by cooling unit 18. The first and second heater halves 40 and 42 are moved between the closed and open positions by hydraulic cylinders 56 and 58 for the heating and cooling operations, respectively. The first and second hydraulic cylinders 56 and 58 are controlled by a hydraulic and valve control unit 60 which is ultimately controlled by the system control unit 20. The operation of hydraulic pistons and cylinders is well known.

For the heating operation each heater half 40 and 42 is provided with a plurality of ½ inch diameter vertical chambers for housing heater elements 62 therein. The heater elements 62 maintain the first and second heater halves 40 and 42 at a substantially constant temperature between about 270° F. and 450° F., depending on the size of the carbon block and the mesh size of the mixture 11. Each heater half 40 and 42 is maintained in this temperature range regardless of the position of the heater halves and throughout the entire carbon block manufacturing molding process. Maintaining the heater halves 40 and 42 in the desired temperature range is substantially more efficient than providing a solid one-piece mold (see FIG. 8) which is both heated and cooled. The height of the first and second heater halves 40 and 42 need only he equal to the height of the finished molded carbon block. The first and second heater halves 40 and 42 may he replaced with other heater halves having a different heights if it is desired to produce carbon blocks having a different height. Thus, the first and second heater halves 40 and 42 are interchangeable with other heater or mold halves for the production of a variety of different sized carbon blocks.

The mold top 44 includes a plate body 45, openings 64, hydraulic actuator cylinder 66, and cam followers 68. The plate body of the mold top 44 is moveable between an extended position adjacent the top surface of sleeve 46, and a retracted position spaced from sleeve 46. In the extended position the plate body 45 closes the top end of the sleeve 46 when the mixture of carbon particles and binder 11 is positioned therein. In the retracted position, the plate body 45 exposes the top end of the sleeve 46 to provide access thereto for insertion of the mixture of carbon particles and binder 11 and for removal of the finished carbon block. The cam followers 68 ride in cam tracks (shown in phantom in FIG. 4) to direct movement of the plate body 45 from the extended position to the retracted position. The openings 64 receive the center tube 50 therethrough during compression of the mixture of carbon particles and binder 11. Passing the center tube 50 through the openings 64 in the mold top 44 assures that a central opening is formed entirely through the finished carbon block. It will he appreciated that plate 45 closes the top of sleeve 46 and around center tube 50 to prevent escape of the particulate mixture, yet to permit escape of fluids and air. The hydraulic cylinder 66 moves the mold top 44 between the extended and the retracted positions. The hydraulic cylinder 66 is controlled by hydraulic and valve control 60 which is further controlled by the system control unit 20.

Each sleeve 46 includes an interior surface 70 (see FIG. 2), an exterior surface 71 (see FIG. 2), an open top end 72 and an open bottom end 74. The open bottom end 74 is for engaging the mold bottom 48. The open top end 72 is open to permit filling sleeve 46 with the mixture of carbon particles and binder 11 and remove the finished carbon block. Preferably, the sleeve 46 is constructed of aluminum or steel which provides transfer of heat from the first and second heater halves 40 and 42 to the carbon mixture 11 and for cooling the carbon. In addition, the interior surface 70 of the sleeve 46 is coated with Teflon or other lubricated surface material to permit removal of the finished carbon block from the sleeve through open top end 72. Other lubricant coatings, such as malonate or spray-on lubricants, may be used in place of the Teflon coating. In a preferred embodiment, the diameter of the sleeve 46 is approximately 2 inches, the thickness of the sleeve is approximately 1/16 inches, and the length of the sleeve 46 is 20 inches. The length of sleeve 46 should be at least 1½ times the length of the finished carbon block as the granular carbon particles and binders must settle and be compressed to form the desired porosity in the finished carbon block.

Each mold bottom 48 of the mold unit 12 includes a circular puck member 76, and a Teflon O-ring 78. The puck member 76 is moveable within the sleeve 46 from a first position where the mixture of carbon particles and binder 11 are in an uncompressed state (FIG. 2) to a second position where the mixture of carbon particles and binder 11 is in a compressed state (FIG. 3) for heating and cooling. The Teflon O-ring 78 fits around the circumference of the puck member 76 and seals against the interior surface 70 of the sleeve 46 for sealing the mold bottom 48 in the sleeve to prevent loss of the mixture particles and also to permit smooth traversal of the mold bottom 48 within the sleeve 46. In addition, it is desirable to lubricate a top surface 79 (see FIG. 2) of the puck member with Teflon or other lubricant material to facilitate easy and breakage free removal of the finished carbon block from the mold bottom 48. In place of the lubricant, a washer may he placed on the puck member before the mixture is poured into the sleeve. The washer forms to the carbon block is later removed after the block has cooled and solidified.

The center tube 50 protrudes from the center of the top surface of the mold bottom 48 and provides a center opening in the finished carbon block. The center tube 50 is not used if a solid carbon block is to be fabricated. A top of the center tube 50 protrudes through the openings 64 in the mold top 44 during the compression, heating and cooling stages of operation. The center tube 50 preferably includes a channel 90 (FIGS. 2 and 3) for receiving cooling fluid therethrough during the cooling stage of operation.

FIG. 1 illustrates a preferred embodiment wherein a plurality of mold units 12 are provided. In such arrangements backing plate members 52 and 54 are used to mount the first and second heater halves 40 and 42 for uniform and synchronized movement of the first and second heater halves. While FIG. 1 illustrates only two such mold units 12, further additional mold units 12 are easily included in the automated carbon block molding machine 10.

It is also to be noted that while the mold unit 12 of the preferred embodiment includes sleeve 46, the sleeve may be eliminated and the mold be formed of the material surfaces of the mated half heater units. In such an arrangement without sleeve 46, the first and second mold would to close around the mold bottom 48, the carbon mixture 11 would be dispensed into the heated mold formed by halves 40 and 42 in the closed position, and the halves 40 and 42 would include cooling tubes as shown in the alternative embodiment of FIG. 8.

Compression unit 14 includes hydraulic actuators 90, one for each mold unit 12, and the hydraulic supply and valve control unit 60 for controlling each or all of the hydraulic actuators 90. Hydraulic supply and valve control unit 60 is ultimately controlled by the system control unit 20. Each hydraulic actuator 90 includes a piston 92 and a cylinder 94 and is movable between first, second and third positions. A top end of each piston 92 is mounted to a bottom surface of the respective mold bottom 48 for raising and lowering the mold bottom 48. When piston 92 is in its lowermost, or first position (FIG. 2), the mixture of carbon particles and binder 11 is poured into the sleeve 46 from dispensing unit 22. The piston 92 is then raised to its second position (see FIG. 3) to raise the bottom mold 48 and compress the mixture of carbon particles and binder 11 contained within the sleeve 46 to achieve desired porosity for the finished carbon block. For a finished carbon block approximately 12 inches in length the hydraulic actuators 90 provide between 1500 and 2500 pounds per square inch (psi). The piston 92 raises the finished carbon block to the third position (shown in phantom in FIG. 4) to force the carbon block from machine 10.

Heating unit 16 includes electrical heaters 62, temperature probes 105 and heater controls 107. The electrical heaters 62 are integrally formed within chambers of the first and second heater halves 40 and 42 to heat the first and second heater halves to a temperature between 270° F. and 450° F. throughout the entire operation of the carbon block manufacturing process. Suitable electrical heaters 62 are available from Watlow Controls of St. Louis, Mo. as Watlow 200 Watt Fire Rod Cartridge heater, part number J10A64. The temperature probes are also positioned in the first and second heater halves 40 and 42 to reuse the current temperature of the heater halves for feedback to the heater controls 107. The temperature controls 107 regulate the electrical heaters, based on feedback from the temperature probes 105, to maintain the first and second heater halves 40 and 42 at the desired temperature. Suitable temperature controls 107 are available from Watlow Controls of St. Louis. Mo. as the Watlow "Din-a-might" solid state power control.

The cooling unit 18 includes a water or other coolant supply 100, distribution tubing 102, spray heads 104, center tube cooling distribution tubing 106, and catch pan 110. System control unit 20 controls the flow of the coolant from the coolant supply 100, through the distribution tubing 102, to the spray heads 104. The spray heads 104 are oriented adjacent to but spaced apart from sleeve 46 to permit the first and second heater halves 40 and 42 to surround the sleeve 46 without interfering with the spray heads 104. After the heating operation, the first and second heater halves 40 and 42 are moved to their open position spaced from the sleeve 46, so that the spray heads 104 are exposed to the exterior of the sleeve 46. The spray heads 104 spray coolant directly onto the exterior surface 71 of the sleeve 46 for approximately 30 seconds to 1 minute to and solidify (cure) the plastic binder material, thereby bonding the carbon particles together. It is preferred to cool the exterior surface 71 of the sleeve via direct exposure to the coolant as opposed to having coolant tubes 100 running through a one-piece mold unit as in the alternative embodiment of FIG. 7. The center tube cooling distribution tubing 106 cools the molded carbon block from the inside to further reduce the cooling time. The center tube cooling distribution tubing 106 can be connected to an air supply (not shown) instead of the water cooling supply 100. Catch pan 110 catches the coolant water as it drips from the exterior of the sleeve 46 for recycling to the cooling supply 100. It should be understood that if time is not a factor in the production of the carbon blocks, then the entire cooling unit 18 could be removed in which case the carbon blocks would simply cool over time.

Dispensing unit 22 includes a main storage tank 120, and, for each sleeve 46, a supply hose 122, a measuring chamber 124, a first gate 126, a second gate 128 and a nozzle 130. The main storage tank 120 stores the mixture of carbon particles and binder 11. The first gate 126 separates the main storage tank 120 from the measuring chamber 124. The second gate 128 forms the exit from the measuring chamber 124 to the nozzle 130. The supply hose 122 is of a flexible accordion construction and permit the nozzle 130 to be inserted into and removed from the open end of the sleeve 46 for dispensing the mixture of carbon particles and binder 11 filling the chamber 124 into the sleeve 46. The measuring chamber 124 may be replaced with other measuring chambers of different sizes for making carbon blocks of different sizes.

The dispensing operation starts with both the first and second gates 126 and 128 in their closed positions. The first gate 128 is opened and gravity pulls the mixture of carbon particles and binder 11 into the measuring chamber 124. When the measuring chamber 124 is full, the first gate 126 is closed. Nozzle 130 is then positioned in the open top end 72 of the sleeve 46. The second gate 128 is opened to dispense the premeasured amount of carbon particles and binder into the sleeve 46. The dispensing unit 22 eliminates the individual measuring cups used in the prior art mold technique and provides a quick and easy way to fill the sleeves 46 for the automated carbon block molding machine 10. Of course, other known automated filling or dispensing devices may be used in place of the dispensing unit 22.

The system control unit 20 is a microprocessor programmed to control the movement of the first and second heater halves 40 and 42 between the open and closed positions, the movement of the mold top 44 between the extended and retracted positions, and the operation of the heating unit 16, the pressure unit 14, and the cooling unit 18. Preferably, system control unit 20 also operates gates 126 and 128, and controls movement of dispensing unit 22 so that nozzles 130 engages top ends 72 of sleeve 46. The system control unit 20 includes temperature readout displays (not shown) for indicating the temperature of the heater halves 40 and 42, timer displays (not shown) for displaying the time period remaining in the heating and cooling cycles, and other controls (not shown) for regulating power to the components of the machine. System control unit 20 receives temperature signals from the temperature sensors associated with heater control 106 and pressure signals from pressure sensors associated with hydraulic control 60 to operate the machine. Sensor switches (not shown) such as position or limit switches may also be located with respect to the piston 92, the mold top 44, and the first and second heater halves 40 and 42 to sense the movement of the components which then triggers timers in the control unit for the heating and cooling operations.

Figure 7:
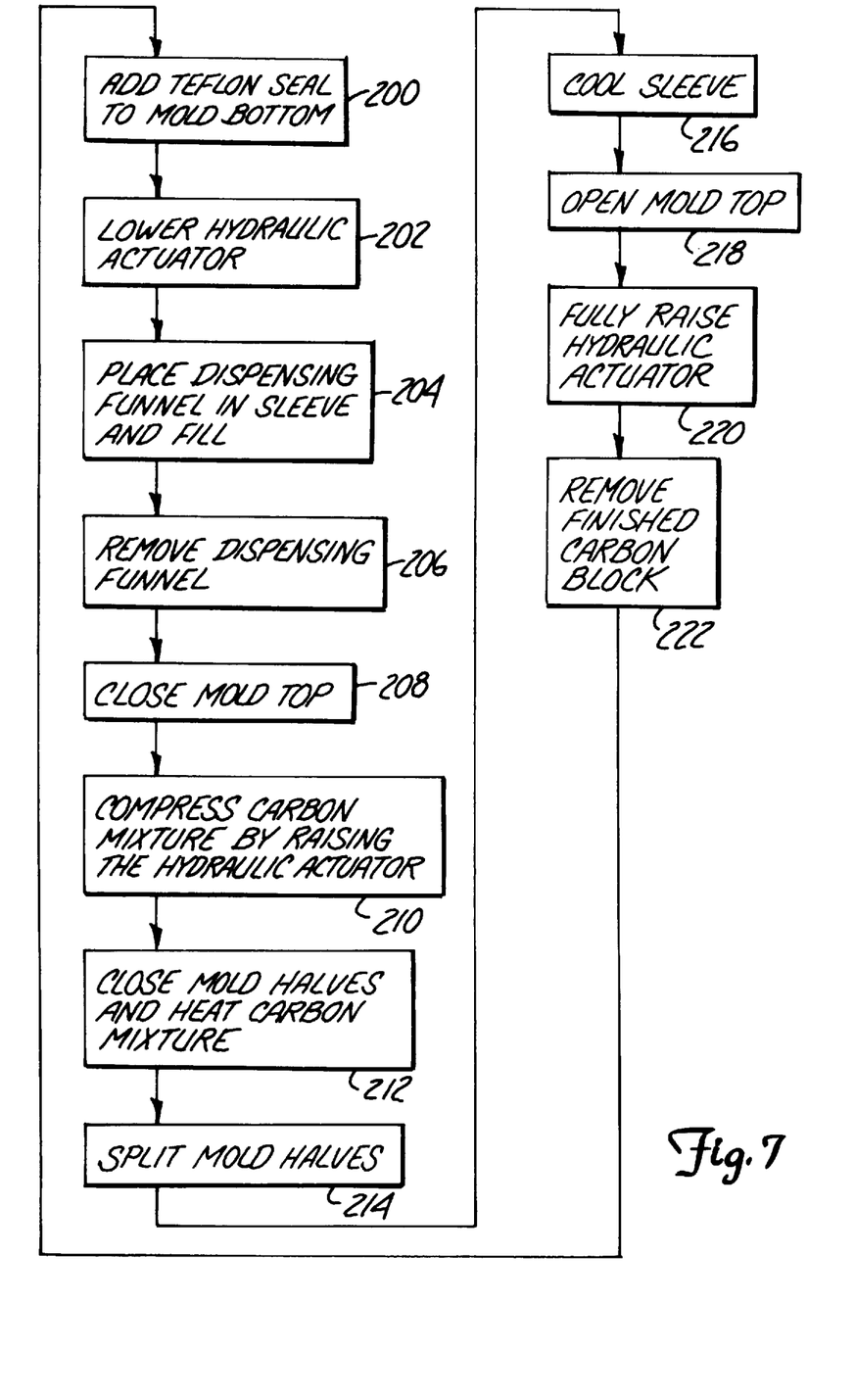
FIG. 7 is a flow diagram of the steps for operation of the automated carbon block molding machine of FIG. 1.

FIG. 7 describes the overall operation steps for making carbon blocks using the machine 10 of the present invention. At step 200 the top surface 79 of the mold bottom 48 is coated with a liquid lubricant (if the mold bottom 48 is not already constructed with a washer or Teflon-coated material) to provide easy removal of the finished carbon block. At this time, the mold bottom 48 is in the third and highest position wherein the mold bottom 48 is exposed from the top of the sleeve 46.

At step 202 the control unit 20 operates the hydraulic controls 60 to lower piston 92 to the first position, thereby lowering the mold bottom 48 to the bottom of the sleeve 46 as shown in FIG. 2. In this position, the cooling unit 18 is "off" and the heater units 12 are separated from sleeve 46 and maintained at the desired temperature. Also, the top wall of the mold is in a retracted position so that the dispensing unit 22 may be used to dispense the carbon particles into the sleeve 46. At step 204, control unit 20 opens the first gate 126 of the dispensing unit 21 to fill the measuring chamber 124. Preferably, a fill switch (not shown) is associated with chamber 124 to provide a signal to system control unit 20 that chamber 124 is filled. Control unit 20 then operates dispenser unit 22 to position nozzle 130 in the top of sleeve 46. When the nozzle 130 is positioned in the open end of the sleeve 46, control unit 20 opens the second gate 128 to release the contents of the measuring chamber 124 into the sleeve 46. At the same time, the first gate 126 is closed. At step 206, the nozzle 130 is removed from the sleeve 46 and the supply hose 122 moved out of the way.

Figure 3:
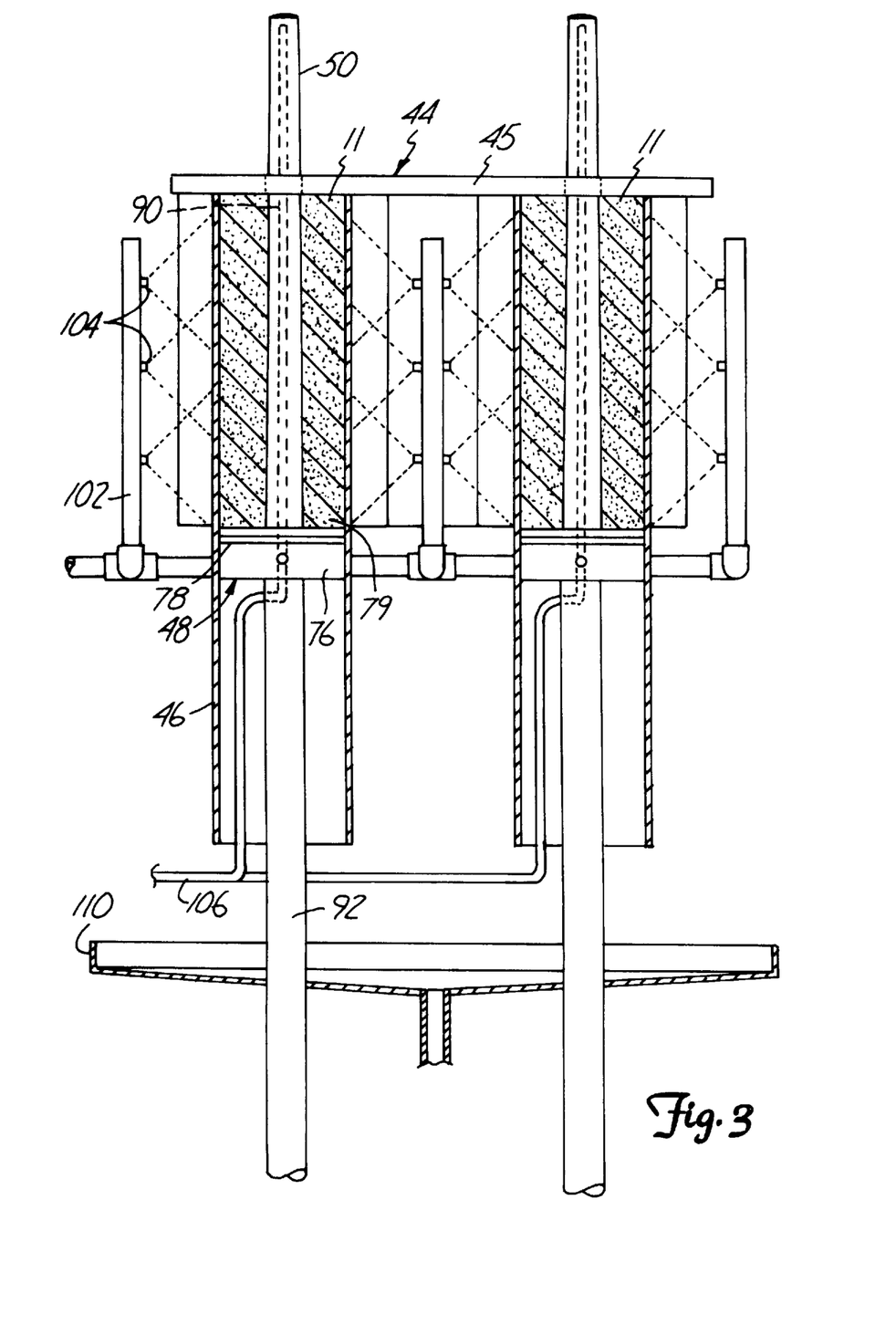
FIG. 3 is a view of the automated carbon block molding machine similar to FIG. 2 in a heating stage of operation and showing cooling jets used in a cooling stage of operation.
Figure 5:
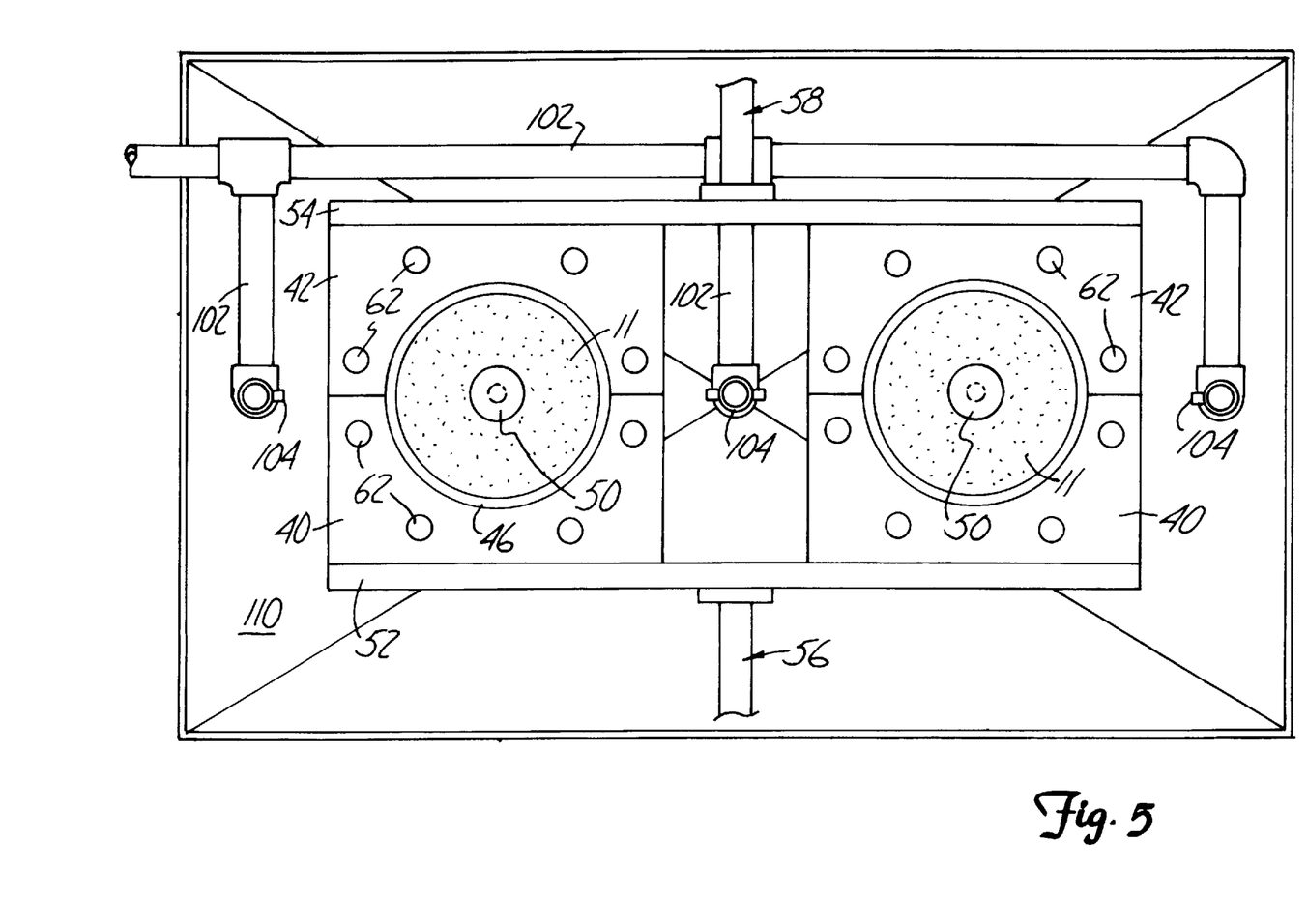
FIG. 5 is a top plan view of the automated carbon block molding machine of FIG. 1 in the heating stage of operation, with some parts removed for clarity.

At step 208 control unit 20 operates hydraulic actuator 66 to move the mold top 44 into position on the open top end 72 of the sleeve 46. As shown in FIG. 3, at step 210 the piston 92 is then operated to raise the mold bottom 48 to its second position to compress the mixture of carbon particles and binder 11 in the sleeve 46. At step 212 control unit 20 closes the first and second heater halves 40 and 42 around the sleeve 46, as shown in FIGS. 4 and 5. Since the first and second heater halves 40 and 42 are already at the desired temperature, the carbon particles and binder in the mold unit 12 are now cured for a pre-programmed term between 2 and 5 minutes. However, this may also vary depending on the temperature of the heater halves 40 and 42. Typically, the cure time is 3 to 4 minutes. Alternatively, the cure time may he based on the sensed temperature of the heater halves 40 and 42.

At step 214 the carbon block has been cured for the programmed period and formed in the mold unit 12. The first and second heater halves 40 and 42 then are separated to then open position. Control unit 20 continues to operate heater halves 40 and 42 so that they are maintained at the desired temperature. At step 216 the sleeve 46 is then cooled. FIGS. 3 and 6 illustrates the cooling of the sleeve 46 which pre-programmed to be accomplished in approximately 30–60 seconds. The cooling unit 18 is operated to supply water or other cooling fluid through the distribution tubing 102 and spray heads 104 directly to the exterior surface 71 of the sleeve 46. The center tube cooling distribution tubing 106 cools the interior of the finished carbon block. Excess coolant is recovered by tray 110 for re-circulation to the coolant supply 100 or for disposal.

At step 218 after cooling of the finished carbon block, control 20 operates the hydraulic controls 60 to operate cylinder 66 to move mold top 44 away from the top of sleeve 46. At step 220 piston 92 is operated to its third position to raise the finished carbon block out of the sleeve 46. The operator may then remove the finished carbon block from the center tube 50 as indicated at step 222. The machine is then ready to repeat the process.

It is to be noted that the system control unit is programmed to automatically control activation of the hydraulic actuators 56, 58, 66, 90, and the coolant spray 18, and the maintenance of the first and second heater halves 42 and 44 at the desired temperature. Thus, the system control 20 controls the operation of steps 202–220. If desired, the operations of the filling of the measuring chamber 124 and positioning of the nozzle 130 may be performed manually.

Figure 8:
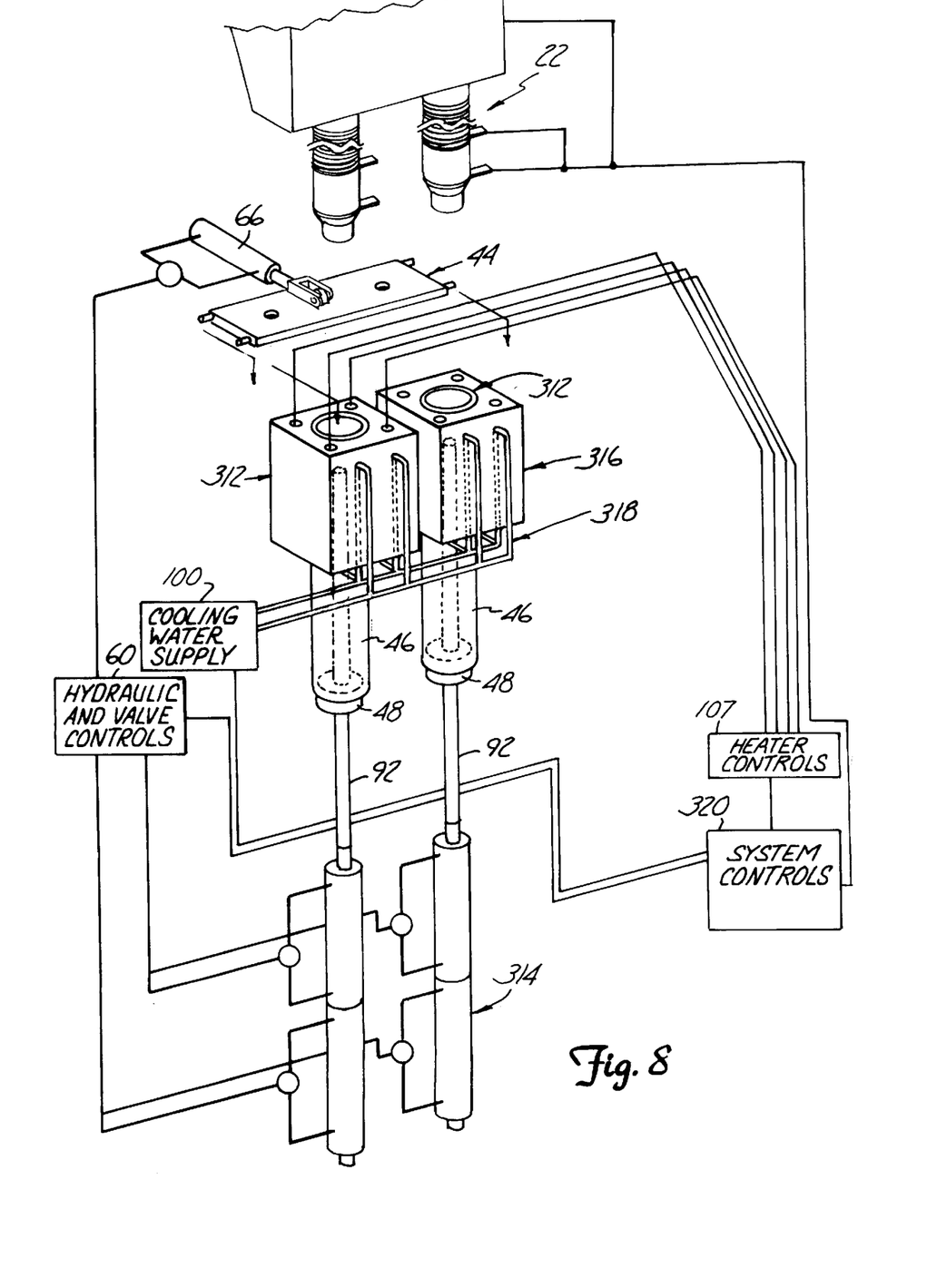
FIG. 8 is a diagrammatic view of another embodiment of an automated carbon block molding machine in accordance with the teachings of the present invention.

FIG. 8 illustrates another embodiment of the present invention. Those elements which are the same as and which function the as elements in the embodiment discussed above are indicated with the same reference numerals as used above. In this arrangement, the automated carbon block molding machine 10 includes at least one mold unit 312, a compression unit 314, a heating unit 316, a cooling unit 318, a control unit 320, and a dispensing unit 22. The primary difference between this embodiment and the previously discussed embodiment is that the heater unit 316 is a one-piece unit which both heats and cools a sleeve 46 containing the mixture of carbon particles and binder 11.

The one-piece heater unit 312 includes heating chambers for housing the heater elements 62 and also, cooling chambers (not shown). The cooling unit 318 includes a coolant supply 100, supply tubing 350, and the return tubing 352 to form a coolant distribution system. The supply tubing directs a flow of coolant from the coolant supply 100 to a top end of the plurality of cooling chambers at a top of the mold unit 312. The coolant flows into the plurality of cooling chambers which run vertically down through the mold unit and then into the return tubing 352 for return to the coolant supply 100.

The control system 320 controls the activation of the heater elements and the cooling unit so that the heater elements are not activated at the same time the cooling unit is activated and vice versa. Activation of the heating elements raises the temperature of the heating unit 312 from a cooled state to the desired temperature for cooking the compressed carbon mixture. After the cooking step, the heaters are turned off and the cooling unit 318 flushes the cooling chambers of the mold unit with cold water to lower the temperature of the mold unit and, by conduction the temperature of the sleeve and the finished carbon block therein.

While the compression unit 316 may include a single hydraulic actuator as discussed in the previous embodiment, it is shown with a pair of hydraulic actuator placed end to end. The compression unit 31 6 function the same as the one previously discussed.

Although the present invention has been described with reference to preferred embodiments, workers skilled in the art will recognize that changes may be made in form and detail without departing from the spirit and scope of the invention.

What is claimed is:

1. An automated carbon block molding machine for making cylindrical carbon blocks from granular carbon particles and a binder, the machine comprising:

a mold unit having
   a sleeve defining a chamber having an open end for receiving the granular carbon particles and the binder,
   a piston supporting a bottom wall having a surface closing an end of the chamber opposite the open end,
   an actuator for moving the piston along a longitudinal axis within the chamber,
a top wall movable between a first position exposing the open end of the chamber so that the chamber can be filled with the granular carbon particles and binder and a second position where the open end of the chamber is closed to provide a mold for the carbon block, and
a center member extending along the axis within the chamber between the bottom wall and the top wall when the top wall is in its second position;
a heating unit having first and second heater parts, each heater part being movable between a first position where the heater part is in contact with the sleeve and a second position where the heater part is not in contact with the sleeve, the heating unit being operable to heat the sleeve to melt the binder in the chamber to bond the compressed carbon particles to form the carbon block within the chamber;

cooling means for cooling the carbon block in the chamber; and a programmed control unit for selectively operating the actuator to move the piston to compress the granular carbon particles and binder in the chamber and for subsequently operating the heating unit to heat the sleeve and the compressed granular carbon particles and binder.

2. The automated carbon block molding machine of claim 1, wherein the actuator operates the piston to displace the bottom wall within the sleeve to compress the granular carbon particles and the binder.

3. The automated carbon block molding machine of claim 2, wherein the actuator is a hydraulic actuator to operate the piston to produce a pressure on the granular carbon particles and binder of between 1500 and 2500 psi.

4. The automated carbon block molding machine of claim 1, wherein the machine further comprises means for moving the top wall between its first position and its second position.

5. The automated carbon block molding machine of claim 4, wherein the control unit controls movement of the top wall between its first and second positions so that the top wall is in its second position before the actuator is activated.

6. The automated carbon block molding machine of claim 4, wherein the center member forms a center opening along a length of the carbon block.

7. The automated carbon block molding machine of claim 6, wherein the top wall has an opening therethrough for receiving the center member therein during compression of the granular carbon particles and binder, and wherein the machine further comprises means for moving the top wall between the first position and the second position.

8. The automated carbon block molding machine of claim 1, wherein the control unit operates the heating unit to heat the granular carbon particles and binder to a temperature between 270° F. to 450° F.

9. The automated carbon block molding machine of claim 8, wherein the control unit operates the heating unit to heat the granular carbon particles and binder for a cycle of between 2 and 5 minutes.

10. The automated carbon block molding machine of claim 1, wherein the cooling means includes a plurality of cooling jets mounted to the machine and arranged to spray a cooling fluid onto the sleeve.

11. The automated carbon block molding machine of claim 10, wherein the control unit operates the cooling means during the operation of the machine.

12. The automated carbon block molding machine of claim 10, wherein the center member forms a center opening along a length of the carbon block.

13. The automated carbon block molding machine of claim 12, wherein the center member is a tube and the cooling means includes a fluid connection to the center member to permit a cooling fluid to pass through the tube of the center member.

14. The automated carbon block molding machine of claim 1, wherein the first heater part and second heater part each are movable between a first position adjacent one another and contiguous the sleeve and a second position separated from one another and the mold unit.

15. The automated carbon block molding machine of claim 14, wherein the first heater part and the second heater part each has at least one electric heater disposed therein.

16. The automated carbon block molding machine of claim 15, wherein the control unit operates the first heater part and the second heater part at a temperature above 270° F. during the entire operation of the machine.

17. The automated carbon block molding machine of claim 15, further comprising a first piston for moving the first heater part between its first and second positions, and a second piston for moving the second heater part between its first and second positions.

18. The automated carbon block molding machine of claim 17, wherein the first and second pistons are operated by the control unit such that the first and second pistons operate the first and second heater parts to their first position during compression of the granular carbon particles and the binder, and operates the first and second heater parts to their second position during a cooling cycle of the carbon block.

19. The automated carbon block molding machine of claim 14, wherein the cooling means includes at least one cooling jet for spraying a cooling fluid on an exterior surface of the sleeve when the first heater part and the second heater part are in the second position.

20. The automated carbon block molding machine of claim 19, wherein the cooling means further includes a cooling tube disposed in the center member around which the carbon block is formed, the cooling tube having a channel through which coolant flows.

21. The automated carbon block molding machine of claim 14, wherein the top wall has an opening therethrough for receiving the center member therein during compression of the granular carbon particles and binder, and wherein the machine further comprises means for moving the top wall between the first position and the second position.

22. The automated carbon block molding machine of claim 14, wherein the center member includes a cooling opening along a length thereof, the cooling means being operatively connected to the cooling opening for cooling the center member and the carbon block.

23. The machine of claim 1 wherein the heating unit is separate from the mold unit and is capable of selective contact with the mold unit.

24. The automated carbon block molding machine of claim 1, wherein the cooling means includes a cooling tube disposed in the center member around which the carbon block is formed, the cooling tube having a channel through which a coolant flows.

25. The automated carbon block molding machine of claim 1, wherein the control unit operates at least one heater part while at least one heater part is in both its first and second positions so that the heating unit is constantly maintained in a heated state for heating the sleeve.

26. The automatic carbon block molding machine of claim 1, wherein the top wall includes an opening and the center member is mounted to the bottom wall and axially movable with the piston, the center member extending through the opening in the top wall when the top wall is in its second position.

27. An automated machine for manufacturing cylindrical carbon blocks from a mixture of granular carbon particles and a binder, the machine comprising:

a sleeve defining a chamber having an axis, the chamber having an open end for receiving the mixture;

an axially movable piston closing an end of the chamber opposite the open end;

a top wall movable between a first position exposing the open end of the chamber so that the chamber can be filled with the mixture of granular carbon particles and binder and a second position where the open end of the chamber is closed;

a center member extending along the axis within the chamber between the piston and the open end when the top wall is in its second position;

a multiple-part heating unit surrounding the sleeve, each heater part being movable between a first position where the heater part is in contact with the sleeve to a second position where the heater part is not in contact with the sleeve; and cooling means for cooling the carbon particles and binder within the sleeve;

whereby the piston is moved along the axis within the chamber to compress the mixture of granular carbon particles and binder in the chamber, the multiple-part heating unit is operated to melt the binder, and the cooling means is operated to solidify the binder to bond the carbon particles to form the carbon block.

28. The machine of claim 27, further comprising a programmed control unit for selectively operating the piston to compress the mixture of granular carbon particles and binder in the chamber, the multiple-part heating unit to melt the binder, and the cooling means to bond the granular carbon particles.

29. The machine of claim 27, wherein the top wall includes an opening therethrough, and the center member includes a tube extending from the piston through the opening in the top wall when the top wall is in its second position.

30. The machine of claim 28, wherein the control unit operates each heater part while the heater part is in both the first and second positions so that the heating unit is constantly maintained in a heated state for heating the sleeve and the mixture.

* * * * *